United States Patent [19]

Favreau

[11] 4,317,129
[45] Feb. 23, 1982

[54] APPARATUS FOR THE DIGITIZATION OF VIDEOFREQUENCY TELEVISION SIGNALS

[75] Inventor: Michel Favreau, Paris, France
[73] Assignee: Thomson CSF, Paris, France
[21] Appl. No.: 165,660
[22] Filed: Jul. 3, 1980
[30] Foreign Application Priority Data Jul. 4, 1979 [FR] France ............................. 79 17357

[51] Int. Cl.³ ............................................. H04N 7/00
[52] U.S. Cl. ..................................... 358/13; 358/141; 358/138; 358/160
[58] Field of Search .................. 358/12, 13, 160, 141, 358/138

[56] References Cited

U.S. PATENT DOCUMENTS 4,218,697 8/1980 Leventer ............................... 358/13
4,227,204 10/1980 Rossi ..................................... 358/13

Primary Examiner—Robert L. Richardson

[57] ABSTRACT

The present invention relates to an apparatus for the digitization of videofrequency television signals making it possible to improve the subjective definition of known systems using a non-orthogonal structure of points and to obviate the disadvantages of said system structure. This apparatus comprises on reception an analog-digital converter by high speed sampling corresponding to the full definition of the processed spectrum followed by an inhibitor of one sample out of every two and on reception, a conventional decoder, whose analog output signal is added to the other part of the spectrum resulting from a logic processing of the original binary train or stream.

6 Claims, 3 Drawing Figures

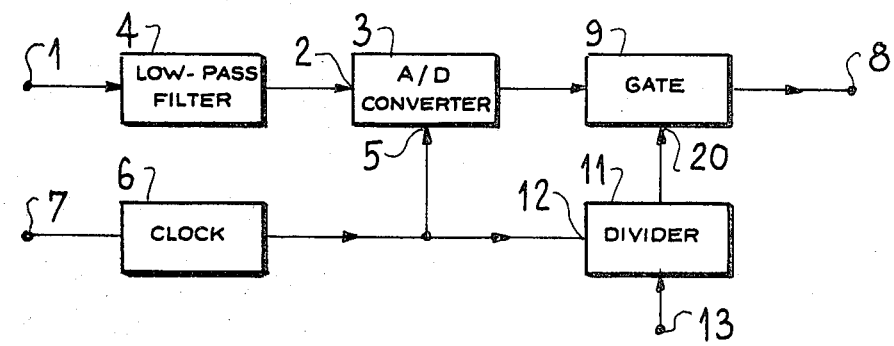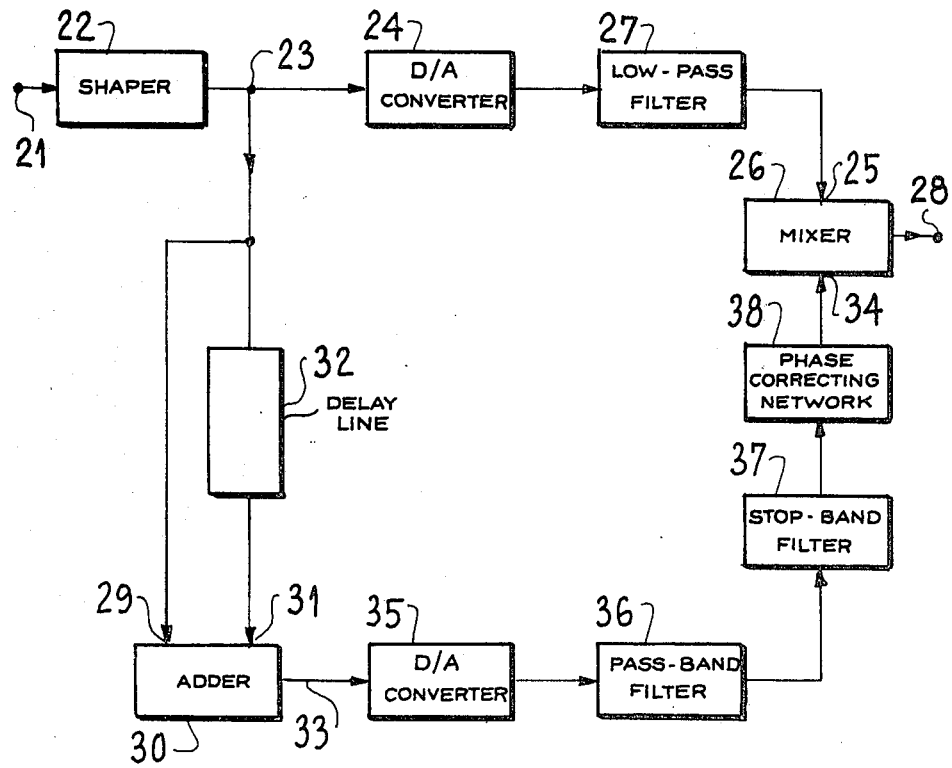

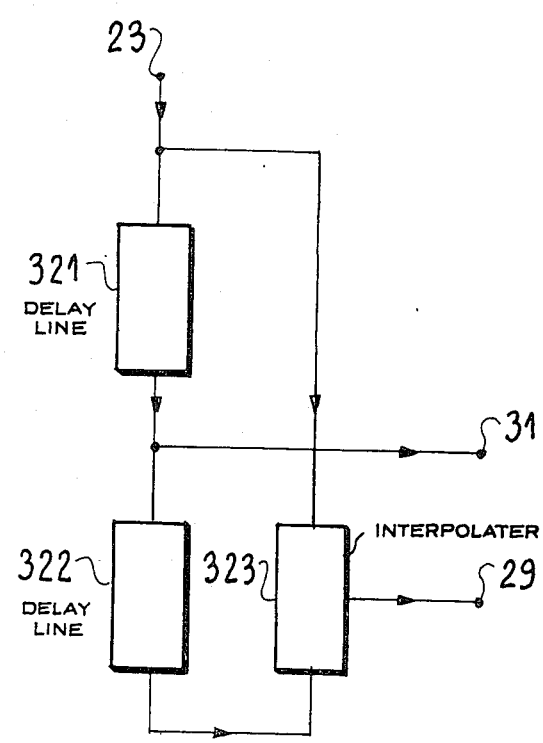

APPARATUS FOR THE DIGITIZATION OF VIDEOFREQUENCY TELEVISION SIGNALS

BACKGROUND OF THE INVENTION

The invention relates to apparatus for the digitization of videofrequency signals used in television comprising on transmission a coder for said signals in digital form and on reception a decoder which restores them to analog form, as well as to transmitting equipment incorporating such an apparatus.

Certain known apparatus use a sampling frequency which is more than twice as high as the maximum videofrequency to be transmitted making it possible to obtain a good definition with an orthogonal structure of the points of the image, i.e. the latter are arranged in column form one above the other in conventional manner. They have the disadvantage of requiring a sampling frequency close to 12 MHz and therefore a considerable band width for the standard 625 lines, 5.5 MHz system.

For sampling the same signal, others use a lower sampling frequency, e.g. 8.875 MHz which is close to double the frequency of the subcarrier of the PAL system, i.e. less than double the maximum frequency to be transmitted (so-called sub-Nyquist sampling). Theoretically, this system does not make it possible to define a videofrequency above 4.4 MHz or in practice 4 MHz, which is inadequate. This defect can be obviated by selecting a staggered positioning of the image elements (samples) between one line and the next, leaving it up to the eye of the observer to subjectively carry out a type of interpolation (due to the natural tendency of seeking lines of points in images).

Although this system would appear to be satisfactory for moving images in the case of fixed images and particularly patterns, it is possible to observe a lack of definition in the horizontal direction. Moreover, the staggered structure leads to certain disadvantages during the production of special effects (electronic trick effects, split screen effects, shutters, etc).

BRIEF SUMMARY OF THE INVENTION

The object of the present invention is to obviate the disadvantages referred to hereinbefore by replacing this subjective correction by a simple electronic correction, whilst maintaining the same transmitted sampling frequency and therefore the same band width.

The present invention therefore relats to an apparatus for the digitization of a video frequency signal comprising:

on transmission, at least one coder comprising a first low pass filter having a cut off frequency $F_1$; an analog-digital sampling converter having an input coupled to the output of said first low pass filter, a control input, and an output; a clock of frequency at least equal to $2F_1$ having an output coupled to said control input; and an output circuit having an input coupled to the output of said analog-digital converter and output delivering staggered sampled data having a rhythm $F_E$;

on reception at least one decoder having an input and an output and comprising: a first digital analog converter having an input coupled to the intput of said decoder and an output; a second low pass filter of cutoff frequency $F_2$ slightly below $F_E/2$, having an input coupled to the output of said second low pass filter and an output; a mixer having a first input coupled to the output of said second low pass filter, a second input, and an output which is the output of said decoder; said decoder further comprising a circuit for restoring the upper part of the spectrum of the video frequency signal comprising: a circuit, having an input coupled to the input of the decoder, for combining the staggered sampled data, having an output for delivering orthogonal sampled data at rhythm $2F_E$; a second digital analog converter having an input coupled to the output of said circuit and an output coupled to said second input of said mixer through a band pass filter having a low cutoff frequency equal to $F_2$ and a high cutoff frequency at least equal to $F_1$.

BRIEF DESCRIPTION OF THE DRAWINGS

The invention is described in greater detail hereinafter relative to non-limitative embodiments and with reference to the attached drawings, wherein show:

FIG. 1 a diagram of a coder for the digitization apparatus according to the invention.

FIG. 2 a diagram of a decoder for the digitization apparatus according to the invention.

FIG. 3 is a diagram of a constructional variant of a member of FIG. 2.

DETAILED DESCRIPTION OF THE PREFERRED EMBODIMENTS

In FIG. 1, a terminal for receiving the luminance component of a television signal supplied the signal input 2 of an analog-digital converter 3 across a low-pass filter 4. The second input 5 of converter 3 is connected to the output of a clock 6 having a synchronization control input 7. The output of converter 3 supplies the output 8 of the coder across a gate 9. Whose second input 10 is connected to the output of a divider by two 11 receiving on an input 12 the signal from clock 6 and on an input 13 the synchronization signal.

Such a coder differs from the known coders by the frequency of clock 6 which in this case supplies a sampling frequency double that used in the system referred to hereinbefore, i.e. 17.75 MHz. Correlatively, the band width of the low-pass filter 4 is approximately double that conventionally provided in said system, i.e. the low-pass filter has a cutoff frequency $F_1$ of approximately 8 MHz. In addition. said coder comprises a device for inhibiting the bits of one out of every two samples obtained by the logic gate 9 receiving at its first input the output signal of converter 3 and at its second input 10 a control signal which is half the clock frequency.

Inverter 3 supplies an 8 bit word on each sampling operation and consequently one word out of two is transmitted to output 8.

Moreover, clock 6 and divider 11 receive at their respective inputs 7 and 13 synchronization signals from the processed videofrequency signal in order to synchronize their sampling with the processed luminance component. The latter functions are not described in detail because they are identical to those of conventional digital coders.

The coder described hereinbefore supplies a binary signal which is identical to that of the reference coder, but differs therefrom essentially in two ways, namely the rhythm $F_E=8,875$ MHz of the data, namely 8 bit words alternating with silences of the same duration. However, this special feature is unimportant, because the bit rate must be multiplexed with that of the other components of the videofrequency colour signal by means of the buffer store.

Another feature of this bit rate is much more interesting. It results from the choice of the sampling value and the input low-pass filters which is harmonized with the effective resolution of the signal supplied by the shooting apparatus. Thus, it is known that the quantity of information supplied is distributed in a band which can reach 8 MHz. Thus, the quality of the samples supplied by the coder, both as regards precision and phase, is identical to that which would be obtained with a standard having a rate corresponding to the sampling performed on converter 3.

The significance of such a coder will be better understood after the corresponding decoder has been described.

In FIG. 2, an input terminal 21 for receiving the binary data stream characteristic of the luminance information is connected to the input 23 of a digital-analog converter 24 across a pulse shaper 22.

Converter 24 supplies the first input 25 of an analog mixer 26 across a low-pass filter 27. The input terminal 23 is also connected to a first input 29 of an adder 30 and to its second input 31 across a delay network 32. Finally, the output 33 of adder 30 is connected to the second input 34 of mixer 26 across a digital-analog converter 35, a band filter 36, a stop band filter 37 and a phase correcting network 38.

The present decoder incorporates two decoding channels, one comprising the converter 24 which, in perse known manner, processes the data received line by line. It is associated with the low-pass filter 27 having a cut-off frequency $F_2 \doteq 4$ MHz which is adequate for restoring all the data contained in the corresponding part of the spectrum of the luminance colour signal.

The other channel interleaves into adder 30 the same binary data as previously and those delayed by the delay line 32 by the duration of one line, i.e. each point of one line is horizontally followed by its alter ego appearing in the centre of the gap separating two separate points. Thus, the bit rate is doubled, i.e. 17.75 MHz to which corresponds on this occasion a structure of orthogonal points. The converter 35 converts this bit rate into an analog signal as if it consisted of a succession of samples at a rhythm of 17.75 MHz. However, filter 36 only samples that part of the spectrum between 4 and 6 MHz and filter 37 eliminates all the residual frequencies above $17.75/2 - \epsilon$, i.e. approximately 8 MHz before combining this spectrum with that of the first channel.

Thus, the high frequencies and only the latter coincide on two successive lines, whilst retaining a complete separation of the lower frequencies. The definition of the horizontal lines (in the vertical direction) is thus completely retained (spectrum 0-4 MHz) and the definition of vertical patterns (in the horizontal direction) is supplied by an almost super abundant sampling corresponding to double the effectively transmitted frequency.

This correction mode is justified by the fact that the high frequency of a videofrequency signal always corresponds to vertical transitions of considerable length and under these conditions there is a very considerable information redundancy between one line and the next. Oblique transitions are at a slight disadvantage, but an oblique transmission at 45o corresponds to a spectrum of frequency $1/\sqrt{2}$ times below that of the same vertically positioned transition. It is therefore perfectly restored in the lower part of the video band from 0 to 4 MHz.

It is to be noted that the statistical distribution of oblique transitions in an image is well below that of the vertical transitions and even the horizontal transitions. Besides a better restoration of the high frequencies of the video signal with an independent identical digital flow rate, this circuit makes it possible to obviate the unpleasant effects of staggered distribution during the generation of special effects.

A function of filter 37 is to eliminate interference which can occur during the transmission of horizontal lines of different luminance and uniform over two successive lines.

The apparatus has been described in connection with the digitization of a luminance signal, but can also be used to each of the colour difference components of a conventional colour television signal sampled in an alternating manner, but with different sampling frequencies and filtering band widths. In the same way, it could be applied to a luminance signal in accordance with criteria other than those of the digitization device referred to hereinbefore.

The present circuit serves to improve a digital television system using staggered sampling from one line to the next. The same device can be used for a staggered field arrangement.

It is merely necessary to give the delay line 32 a delay corresponding to the duration of a field ± half line.

The horizontal definition is increased by a large factor on fixed images or stills or the fixed part thereof, but this requires a field store.

It is also possible to improve the fixed image performance of such devices by using a supplementary delay line in accordance with the following drawing showing a different construction of the coupling between the input 23 of converter 24 and inputs 29 and 31 of adder 30.

In FIG. 3, two delay lines 321 and 322 are arranged in series from terminal 23, their common point being connected to terminal 31. The two inputs of an interpolater 323 are respectively connected to the input of line 321 and to the output of line 322, whilst its output is connected to terminal 29.

The delay lines 321 and 322 have an identical delay exactly equal to the duration of a line. At each of its inputs, device 323 receives points in synchronism coming respectively from an advance line and a delay line. By interpolation, it forms the mean value thereof and this value is applied to the input 29 of adder 30. The corresponding signal is displaced in time by a half-interval between two points compared with the signal supplied at terminal 31.

The same diagram is applicable to the staggered field structure by giving line 321 a delay of one field minus a half line and to line 32 a delay of one line.

What is claimed is:

1. An apparatus for the digitization of a video frequency signal comprising:
    on transmission, at least one coder comprising a first low pass filter having a cut-off frequency $F_1$; an analog-digital sampling converter having an input coupled to the output of said first low pass filter, a control input, and an output; a clock of frequency at least equal to $2F_1$ having an output coupled to said control input; and an output circuit having an input coupled to the output of said analog-digital converter and output delivering staggered sampled data having a rhythm $F_E$;

on reception, at least one decoder having an input and an output and comprising: a first digital-analog converter having an input coupled to the input of said decoder and an output; a second low pass filter of cut-off frequency $F_2$ slightly below $F_E/2$, having an input coupled to the output of said second low pass filter and an output; a mixer having a first input coupled to the output of said second low pass filter, a second input, and an output which is the output of said decoder; said decoder further comprising a circuit for restoring the upper part of the spectrum of the video frequency signal comprising: a circuit, having an input coupled to the input of the decoder, for combining the staggered sampled data, hving an output for delivering orthogonal sampled data at rhythm $2F_E$; a second digital analog converter having an input coupled to the output of said circuit and an output coupled to said second input of said mixer through a band pass filter having a low cut-off frequency equal to $F_2$ and a high cut-off frequency at least equal to $F_1$.

2. A digitization apparatus according to claim 1, applied to the reproduction of images having a point structure staggered from one line to the next of a same frame, the combining circuit comprising a delay line, which delay is equal to the duration of one line, havig an input coupled to the input of said decoder and an output, and an adder having two inputs respectively connected to the input and the output of said delay line.

3. A digitization apparatus according to claim 1, applied to the reproduction of images having a point structure staggered from one line to the next in an image, the combining circuit comprising a delay line which delay is equal to the duration of one frame plus or minus the duration of a half line.

4. A digitization apparatus according to claim 1 applied to the reproduction of images having a point structure staggered from one line to the next of a same frame, the combining circuit comprising: a first and a second delay line connected in series, which delays are equal to the duration of one line; an interpolater circuit having two inputs respectively connected to the input of the first delay line and to the output of the second delay line, and an output; and an adder having first input connected to the output of said interpolater circuit and a second input connected to the output of the first delay line.

5. A digitization apparatus according to claim 1 applied to the reproduction of images having a point structure staggered from one line to the next in an image, the combining circuit comprising in series, a first delay line having a delay equal to the duration of one frame minus the duration of a half line, a second delay line having a delay equal to the duration of one line; an interpolater circuit having two inputs respectively connected to input of said first delay line and output of said secnd delay line, and having an output; and an adder having two inputs respectively connected to output of said first delay line and output of said interpolater circuit.

6. A digitization apparatus according to claim 1, wherein $F_E$ equal 8,875 MHz, said coder and decoder processing luminance component of a colour television signal.

* * * * *